US010477372B2

(12) United States Patent
Ray et al.

(10) Patent No.: US 10,477,372 B2
(45) Date of Patent: Nov. 12, 2019

(54) INTER-OPERABLE REMOTE TERMINAL UNIT

(71) Applicant: ABB Schweiz AG, Baden (CH)

(72) Inventors: Apala Ray, Bisnupur (IN);
Deepaknath Tandur, Bangalore (IN);
Pradnya Gaonkar, Goa (IN);
Mallikarjun Kande, Bangalore (IN);
Peter Somdecerff, Broken Arrow, OK (US); Raymond Crow, Bartlesville, OK (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/539,623

(22) PCT Filed: Sep. 15, 2015

(86) PCT No.: PCT/IB2015/057091
§ 371 (c)(1),
(2) Date: Jun. 23, 2017

(87) PCT Pub. No.: WO2016/103064
PCT Pub. Date: Jun. 30, 2016

(65) Prior Publication Data
US 2017/0366926 A1 Dec. 21, 2017

(30) Foreign Application Priority Data
Dec. 24, 2014 (IN) .......................... 6543/CHE/2014

(51) Int. Cl.
*H04W 4/80* (2018.01)
*G05B 19/418* (2006.01)
(Continued)

(52) U.S. Cl.
CPC .......... *H04W 4/80* (2018.02); *G05B 19/4185* (2013.01); *G05B 19/4186* (2013.01);
(Continued)

(58) Field of Classification Search
None
See application file for complete search history.

(56) References Cited

U.S. PATENT DOCUMENTS

| 8,156,213 | B1* | 4/2012 | Deng | .................... H04L 41/084 709/223 |
| 2005/0149626 | A1* | 7/2005 | Manchester | ........ H04L 41/0213 709/220 |

(Continued)

FOREIGN PATENT DOCUMENTS

WO     2012012723 A2     1/2012

OTHER PUBLICATIONS

European Patent Office, International Search Report for PCT/IB2015/057091, dated Dec. 12, 2015, 4 pages.
(Continued)

*Primary Examiner* — Zhitong Chen
(74) *Attorney, Agent, or Firm* — Barnes & Thornburg LLP

(57) ABSTRACT

In aspects, the present invention discloses a method for communicating with a plurality of field devices using a remote terminal unit. The plurality of field devices includes a first set of field devices and a second set of field devices capable of communicating using a first and second wireless communication protocols respectively. The method comprises scanning for a beacon message from a first field device, determining a corresponding wireless communication protocol associated from the first field device, identifying a first set of configuration blocks for communicating with the first field device based on a configuration schema file and the corresponding wireless communication protocol of the first field device, and building a protocol stack for use with a radio front end from the one or more radio front ends using the first set of configuration blocks, for communicat- (Continued)

ing with the first field device from the plurality of field devices.

10 Claims, 5 Drawing Sheets

(51) Int. Cl.
   *H04W 80/02* (2009.01)
   *H04L 29/06* (2006.01)
   *H04W 8/00* (2009.01)
   *H04W 80/00* (2009.01)

(52) U.S. Cl.
   CPC .............. *H04L 69/08* (2013.01); *H04L 69/22* (2013.01); *H04W 80/02* (2013.01); *H04W 8/005* (2013.01); *H04W 80/00* (2013.01); *Y02P 90/18* (2015.11)

(56) References Cited

U.S. PATENT DOCUMENTS

| | | |
|---|---|---|
| 2009/0316628 A1 | 12/2009 | Enns |
| 2011/0228704 A1* | 9/2011 | Oerton ................. H04W 48/16 370/254 |
| 2012/0236768 A1 | 9/2012 | Kolavennu et al. |
| 2013/0070745 A1* | 3/2013 | Nixon .................... H04L 45/74 370/338 |
| 2016/0100437 A1* | 4/2016 | Armstrong ............ H04W 4/023 370/249 |

OTHER PUBLICATIONS

European Patent Office, Written Opinion of the International Searching Authority for PCT/IB2015/057091, dated Dec. 12, 2015, 8 pages.

European Patent Office, International Preliminary Report on Patentability for PCT/IB2015/057091, dated Jun. 27, 2017, 9 pages.

* cited by examiner

| | | | | |
|---|---|---|---|---|
| Application | Service based | Application mapping from legacy protocols | Command oriented | Predefined data types and application procedures |
| Transport | IETF RFC 4944 (6LoWPAN) end to end delivery | Application to application security | Auto Segmented transfer of large data sets | Negotiated segment sizes |
| Network | IETF RFC 4944 (6LoWPAN) | Device To device security | End to End routing | Reliable stream transport |
| Data Link | Time Sync | Frequency Hopping (Fixed slot length) | Frequency Hopping (Configurable slot length) | Mesh Network |
| PHY | IEEE 802.15.4 | | | Mesh Network |

Figure 4

| Protocol ID | Layer 1 | Layer 2 | Layer 3 | ... | Layer 7 |
|---|---|---|---|---|---|
| 1 (WHART) | IEEE 802.15.4 | Block Time sync, Frequency Hopping | D2D security, End to end routing, Mesh network, power optimization | | Command oriented, predefined data types and apps |
| 2 (ISA 100) | IEEE 802.15.4 | Block Time sync, Frequency Hopping, Mesh network, power optimization | IETF RFC 4944 (6loWPAN) IPV6 packets, End to end routing, | | Service based, App mapping from legacy protocols |
| | | | | | |

Figure 5

INTER-OPERABLE REMOTE TERMINAL UNIT

CROSS-REFERENCE TO RELATED APPLICATIONS

This application is a U.S. national stage of International Application Serial No. PCT/IB2015/057091, filed Sep. 15, 2015, which claims priority to Indian Patent Application No. 6543/CHE/2014, filed Dec. 24, 2014. The entire disclosures of both of the foregoing applications are hereby incorporated by reference.

FIELD OF INVENTION

The present invention relates to control systems and industrial automation. More particularly, the present invention relates to communication and network infrastructure utilised in industrial automation.

BACKGROUND

Due to rapid advances in electronic sensors and wireless communications, there has been an increased adoption of wireless communication technology in industrial plants and factories. This increased adoption is attributed particularly due to advantages of wireless communication technology in terms of reduced cabling, flexibility, low maintenance cost compared to wired solution, easy deployment and the like. In light of such increased adoption, a multitude of wireless standards and protocols have emerged over the years to cater to specific industrial applications.

Due to the existence of such varied wireless standards and protocols, design and deployment of communication network in plants is a complex process. Additionally, in industrial plants where the life time of field devices and controllers is in years, it is not suitable to replace a device having a particular protocol when a new protocol is introduced. Additionally, in certain scenarios, it is also not possible to upgrade the devices with new protocols or standards, as the device firmware may not be compatible with the same.

For example, while ZigBee, WirelessHART, ISA100, etc., are based on same physical and link layers standard 802.15.4 technology. In 802.15.4 standard, the new emerging variants are 802.15.4g and 802.15.4k, which target specific utility communication or critical infrastructure network. Even though these standards are part of 802.15.4 family they still cannot communicate directly with ZigBee or WirelessHART systems and devices.

There have been several approaches which have attempted to solve the problems mentioned above. However, there is a need for an improved system and method that solves the problems mentioned above.

SUMMARY OF THE INVENTION

The above-mentioned shortcomings, disadvantages and problems are addressed herein which will be understood by reading and understanding the following specification.

The current invention describes an interoperable network device that is capable of inter-operating with different wireless technology protocols, to provide the necessary flexibility needed to interact with different IOs or field devices having old and newly emerging wireless standard variants. As new standard variants emerge, the interoperable network device is flexible enough to adopt to new technologies, and at the same time able to communicate with devices running older wireless technology variants.

In one aspect, the present invention discloses a method for communicating with a plurality of field devices using a remote terminal unit. The plurality of field devices includes a first set of field devices capable of communicating using a first wireless communication protocol and a second set of field devices capable of communicating using a second wireless communication protocol.

The method comprises scanning for a beacon message from a first field device from the plurality of field devices, determining a corresponding wireless communication protocol associated from the first field device, based on a header of the beacon message, identifying a first set of configuration blocks for communicating with the first field device based on a configuration schema file, and building a protocol stack for use with a radio front end from the one or more radio front ends using the first set of configuration blocks, for communicating with the first field device from the plurality of field devices. The first set of configuration blocks are associated the corresponding wireless communication protocol of the first field device; and In an embodiment, the method further comprises loading one or more additional configuration blocks associated with a third wireless communication protocol onto the remote terminal unit, and modifying the configuration schema file of the remote terminal unit, upon commissioning of a field device capable of communicating using the third wireless communication protocol to the plant.

In another aspect, the present invention discloses a remote terminal unit configured for communicating with one or more servers of a distributed control system over a plant automation network, and a plurality of field devices. The remote terminal unit comprises one or more radio front ends for transmitting and receiving signals from the plurality of field devices, a plurality of configuration blocks; and a controller. The controller is configured to scan for a beacon message from a first field device from the plurality of field devices, determine a corresponding wireless communication protocol associated from the first field device based on a header of the beacon message, identify a first set of configuration blocks for communicating with the first field device based on a configuration schema file, and build a protocol stack for use with a radio front end from the one or more radio front ends using the first set of configuration blocks, for communicating with the first field device from the plurality of field devices.

The first set of configuration blocks are associated the corresponding wireless communication protocol of the first field device.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIG. 4 illustrates a plurality of configuration blocks at various layers, in accordance with an embodiment of the present invention; and FIG. 5 illustrates an exemplary configuration schema file, in accordance with various embodiments of the present invention.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
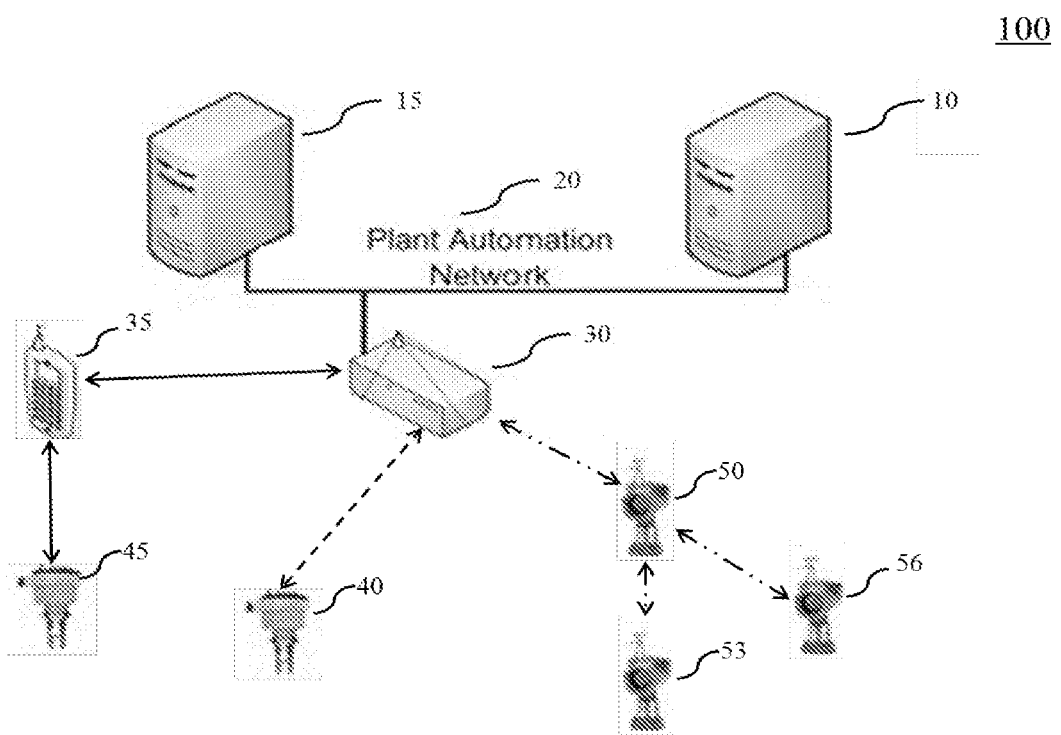
FIG. 1 illustrates a system for communicating with a plurality of devices based one or more wireless protocols, in accordance with various embodiments of the present invention.

FIG. 1 illustrates a system 100 for communicating with a plurality of devices based one or more wireless protocols in an industrial plant, in accordance with various embodiments of the present invention. The system 100 includes a remote terminal unit 30 configured for communicating with one or more servers (shown in FIG. 1 as server 10 and server 15) of a distributed control system over a plant automation network 20, and a plurality of field devices (shown in FIG. 1 a field device 40, field device 45, field device 50, field device 53 and field device 56).

The plurality of field devices includes one or more sensors for measuring various process parameters in the industrial plant, and one or more actuators operatively connected to equipment in the industrial plant. The remote terminal unit 30 enables communication between the servers and field devices by transmitting measurements from the sensors to the servers and by transmitting commands to the actuators from the servers.

The plurality of field devices include a first set of field devices (for example field device 40) which communicates with the remote terminal unit 30 using a first wireless communication protocol. The first wireless communication protocol is a standard industrial communication protocol commonly known in the art, such as, ISA 100, wireless HART, Zigbee and like. Similarly the plurality of field devices include a second set of field devices (for example field device 50, field device 53 and field device 56) which communicate with the remote terminal unit 30 using a second wireless communication protocol. The second communication protocol and the first communication protocol are compatible at the physical layer and are distinct in any of the upper layers (i.e. link layer, network layer, transport layer and application layer). The second wireless communication protocol is also a standard industrial communication protocol commonly known in the art, such as, ISA 100, wireless HART, Zigbee and like.

Figure 3:
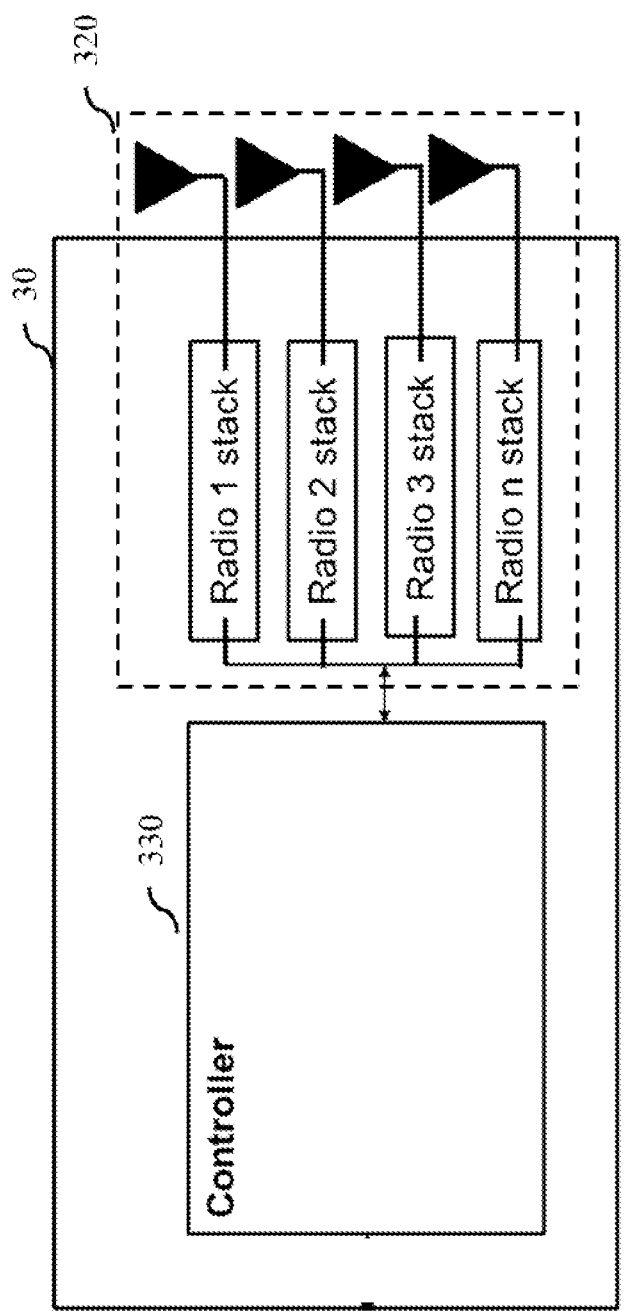
FIG. 3 illustrates a exemplary remote terminal unit, in accordance with various embodiments of the present invention.

The remote terminal unit 30 is capable of supporting a plurality of wireless communication protocols. As shown in FIG. 3, the remote terminal unit 30 includes one or more radio front ends 320 for transmitting and receiving signals from the plurality of field devices and a controller 330 to build one or more protocol stacks for use with the radio front ends for communicating with the plurality of field devices.

A plurality of configuration blocks ae stored in a memory within the remote terminal unit 30 and are used by the controller 330 to build the one or more protocol stacks.

Configuration block herein refers to one particular aspect or function related to communication (such as packet handling, error handling, network management including routing, etc.) to be performed by the remote terminal unit 30 at a particular layer in a protocol stack. For example, a configuration block at a network layer could indicate that an end to end routing technique is to be used in the protocol stack. Similarly, another configuration block at the data link layer could indicate that fixed slot length frequency hopping technique is to be used in the protocol stack. FIG. 4 illustrates a plurality of configuration blocks at various layers which could be used by the controller 330 in building a protocol stack.

The configuration blocks allow the remote terminal unit 30 to support the first and second wireless communication protocol. In an embodiment, upon installation of a new field device (for example field device 45) which communicates using a third wireless communication protocol not supported by the remote terminal unit 30 at the time of installation, the remote terminal unit 30 can be configured to communicate using the third wireless communication. During commissioning of the new field device (i.e. field device 45), additional communication blocks necessary for creating a protocol stack for communicating using the third wireless communication protocol are added to the plurality of communication blocks stored on the remote terminal unit 30 using a configuration tool (not shown in figures). Aspects in relation to the remote terminal unit 30 are further explained in the description of FIG. 2.

Figure 2:
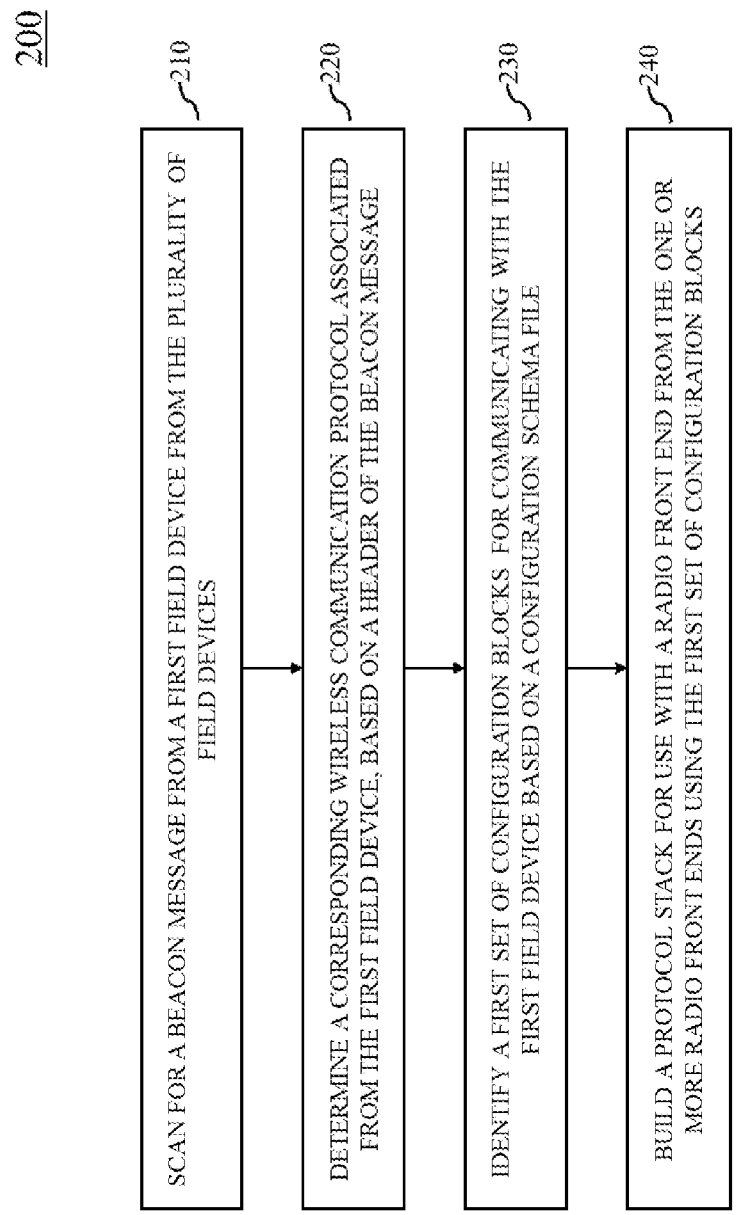
FIG. 2 illustrates a method for communicating with a plurality of devices based one or more wireless protocols, in accordance with various embodiments of the present invention.

FIG. 2 illustrates a method 200 for communicating with the plurality of field devices based one or more wireless communication protocols in the industrial plant using the remote terminal unit 30, in accordance with various embodiments of the present invention. At step 210, the controller 330 of the remote terminal unit 30 scans for a beacon message from a first field device (for example field device 40) from the plurality of field devices. The first field device is from either the first set of field devices or the second set of field devices. The header of the beacon message contains protocol identifier (PID) field that will indicate the first wireless communication protocol associated with the first field device to the remote terminal unit 30. The step of scanning is often done in accordance with procedures established by standards such as IEEE 802.15.4 or IEEE 802.11, etc.

At step 220, upon receiving the beacon message from the first field device 40, the controller 330 of the remote terminal unit 30 determines a corresponding wireless communication protocol associated from the first field device, based on the header of the beacon message.

In an embodiment, the controller 330 of remote terminal unit 30 receives input indicative of the corresponding wireless protocol of the first field device from a configuration tool or from the control system. Based on the input received, the controller 330 determines the corresponding wireless protocol associated with the field device. The input received are in relation various network and system characteristics such as system configuration, power consumption, network configuration (tcp/udp), topology (star/mesh), range, bandwidth, etc.

At step 230, the controller 330 identifies a first set of configuration blocks for communicating with the first field device based on a configuration schema file and the protocol identifier of the corresponding wireless communication protocol of the first field device. The configuration schema file provides a plurality of mappings between the plurality of protocol identifiers and the plurality of communication blocks. An exemplary configuration schema file showing such mappings is shown in FIG. 5. Based on the relational mappings specified in the configuration schema file, the controller 330 identifies the first set of configuration blocks which are associated with the corresponding wireless communication protocol of the first field device and are required for building a protocol stack. For example, as shown in the row 1 of the configuration schema file 500, the Wireless HART communication protocol which has the protocol identifier 1, requires IEEE 802.15.4 configuration block at the physical layer, frequency hopping configuration block at link layer, end to end routing configuration block at the network layer, etc. Accordingly based on the above mentioned exemplary relation mapping, the controller 330 determines or identifies that IEEE 802.15.4 configuration block, frequency hopping configuration block, end to end routing configuration block, etc., as the first set of configuration blocks for building a protocol stack for communicating with the first field device.

At step 240, the controller 330 builds a protocol stack for use with a radio front end from the one or more radio front ends 320 using the first set of configuration blocks, for communicating with the first field device from the plurality of field devices. Using the first set on configuration blocks identified in step 230, the controller builds the protocol stack for communication in accordance with the corresponding wireless communication protocol of the first field device.

In an embodiment, the method 200 further includes loading one or more additional configuration blocks using a configuration tool 35 on the remote terminal unit 30, upon installation and commissioning of a new field device 45 capable of communicating using a wireless communication protocol which prior to the time of commissioning was not supported by the remote terminal unit 30. Additionally, the configuration tool 35 adds a new mapping to the configuration schema file. The new mapping includes the protocol identifier of the wireless communication protocol of the new field device 45 and the additional configuration blocks required for enabling communication. The additional configuration blocks enable the remote terminal unit 30 to support the previously incompatible wireless communication protocol. In an embodiment, the configuration tool loads the additional configuration block, subsequent to interrogating the new field device 45 and receiving the additional configuration blocks during commissioning of the new field device 45.

In an embodiment, when the number of the radio frontends 320 is less than the number of wireless communications that are active, the controller 330 operate the radio frontends 320 in time-domain shared mode. A wireless communication protocol is considered active when there one or more field devices from the plurality of field devices, which are communicating with the remote terminal unit 30 using the corresponding wireless communication protocol. As shown in FIG. 3, where there are multiple radio front ends each capable of running an independent logical protocol stack, the controller 330 does time sharing to enable or disable any protocol stack at a particular time. The controller makes sure that the time sharing occurs without violating the requirements of the running protocol (ex: acknowledgement, retrial actions are completed before the control is switched to another protocol). The controller prioritizes the protocol execution amongst the time shared protocols.

In an embodiment, the remote terminal unit 30 is configured to communicate with a second field device 50 having a wireless communication protocol distinct from the first field device 40. In an embodiment, where the remote terminal unit 30 has two radio front ends, the controller 330 would build two separate protocol stacks: a first protocol stack for communicating with the first field device and a second protocol stack for communicating with the second field device. Since the remote terminal unit 30 has two separate radio front ends and protocol stacks for communicating with the first field device and the second field device, the remote terminal unit 30 acts as a multi-access point.

In another embodiment as mentioned previously, where the remote terminal unit 30 has one radio front end, the controller 330 would build two separate protocol stacks: a first protocol stack for communicating with the first field device and a second protocol stack for communicating with the second field device. Since the remote terminal unit 30 has only one radio front end, the controller 330 would operate the radio front end amongst the two protocol stacks in a time shared mode.

Additionally, the remote terminal unit 30 can act a common device capable of communicating over multiple protocols as mentioned above. For example, the remote terminal unit 30 can receive measurements from a temperature sensor over ISA 100, forward the measurements to an appropriate control device, receive commands from the control device and transmit the same to an actuator over Wireless HART.

Additionally, in an embodiment, the remote terminal unit can work as a bridge or a relay and enable point to point communication between two devices which may have been communicatively incompatible. For example using a first radio end and a first protocol stack, the remote terminal unit 30 can establish communication with a mobile operator device over Bluetooth, and using a second radio end and a second protocol stack, the remote terminal unit 30 can establish communication with a field device 40 over ISA 100. Thus via the remote terminal unit 30 the mobile operator device can interact with the field device 40 for receiving measurements, sending commands, etc.

Additionally, in an embodiment, the controller 330 is configured to set a protocol stack in one of a low power mode or normal power mode. Protocol stacks set in low power mode device goes to stand-by or sleep mode during the known inactive periods. This could be achieved by switching off different parts or components of associated radio front end in the remote terminal unit 30 as needed.

The current invention allows for the remote terminal unit to act as a single integrated, and flexible device capable of operating as access point with input and output from different networks, thus it saves on cost from deploying different network access points. This integrated solution requires only software update post deployment thus allows for easy and cost effective retrofitting. The remote terminal unit as disclosed in the current invention can be used in various wireless industrial markets that require network based operations such as oil and gas, mining, etc.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for communicating with a plurality of field devices using a remote terminal unit of an industrial plant, wherein the plurality of field devices includes a first set of field devices capable of communicating using a first wireless communication protocol and a second set of field devices capable of communicating using a second wireless communication protocol, wherein the remote terminal unit comprises a plurality of configuration blocks for building a plurality of protocol stacks for a plurality of communication protocols, the method comprising:

scanning, with the remote terminal unit, for a beacon message from a first field device from the plurality of field devices, wherein the first field device is from one of the first set of field devices and the second set of field devices;

determining, with the remote terminal unit, a corresponding wireless communication protocol associated with the first field device based on a header of the beacon message;

identifying, with the remote terminal unit, a first subset of the plurality of configuration blocks for communicating with the first field device based on a configuration schema file, wherein the first subset of the plurality of configuration blocks are associated with the corresponding wireless communication protocol of the first field device, wherein identifying the first subset of the plurality of configuration blocks includes determining a first mapping in the configuration schema file based on a header of the beacon message, wherein the configuration schema file comprises a plurality of mappings including the first mapping, and wherein each mapping of the plurality of mappings is arranged for building a corresponding protocol stack using one or more corresponding configuration blocks from the plurality of configuration blocks;

building, with the remote terminal unit, a first protocol stack for use with a radio front end using the first subset of the plurality of configuration blocks, for communicating with the first field device from the plurality of field devices; and setting, with the remote terminal unit, the first protocol stack in one of (i) a normal power mode and (ii) a low power mode in which at least one component of the radio front end is switched off during an inactive period.

2. The method as claimed in claim 1, wherein the header of the beacon message includes a protocol identifier associated with the corresponding wireless communication protocol of the first field device.

3. The method as claimed in claim 2, wherein identifying the first subset of the plurality of configuration blocks for communicating with the first field device based on the configuration schema file includes determining the first mapping in the configuration schema file based on the protocol identifier.

4. The method as claimed in claim 1, further comprising:
loading one or more additional configuration blocks associated with a third wireless communication protocol onto the remote terminal unit; and
modifying the configuration schema file of the remote terminal unit, upon commissioning of a field device capable of communicating using the third wireless communication protocol to the industrial plant.

5. The method as claimed in claim 1, further comprising:
communicating, with the remote terminal unit, with the first set of field devices using the first wireless communication protocol; and
communicating, with the remote terminal unit, with the second set of field devices using the second wireless communication protocol.

6. The method as claimed in claim 5, wherein the first communication protocol and the second communication protocol are (i) compatible at a physical layer and (ii) distinct at one or more upper communication network layers.

7. The method as claimed in claim 1, further comprising loading one or more additional configuration blocks onto the remote terminal unit, using a configuration tool, upon installation and communication with a new field device capable of communicating using a wireless communication protocol that, prior to commissioning, was not supported by the remote terminal unit.

8. A remote terminal unit configured for communicating with one or more servers of a distributed control system over a plant automation network in an industrial plant and with a plurality of field devices, the plurality of field devices including a first set of field devices capable of communicating using a first wireless communication protocol and a second set of field devices capable of communicating using a second wireless communication protocol, the remote terminal unit comprising:

one or more radio front ends for transmitting and receiving signals from the plurality of field devices;

a plurality of configuration blocks for building a plurality of protocol stacks for a plurality of communication protocols; and a controller configured to (i) scan for a beacon message from a first field device of the plurality of field devices; (ii) determine a corresponding wireless communication protocol associated with the first field device, based on a header of the beacon message; (iii) identify a first subset of the plurality of configuration blocks for communicating with the first field device based on a configuration schema file, wherein the first subset of the plurality of configuration blocks are associated the corresponding wireless communication protocol of the first field device, and wherein to identify the first subset of the plurality of configuration blocks includes to determine a first mapping in the configuration schema file based on the header of the beacon message; (iv) build a first protocol stack for use with a first radio front end of the one or more radio front ends using the first subset of the plurality of configuration blocks, for communicating with the first field device from the plurality of field devices; and (v) set the first protocol stack in one of a normal power mode and a low power mode, wherein at least one component of the first radio front end is switched off during an inactive period when the first protocol stack is set in the low power mode;

wherein the configuration schema file comprises a plurality of mappings including the first mapping, and wherein each mapping from the plurality of mappings is for building a corresponding protocol stack using one or more corresponding configuration blocks from the plurality of configuration blocks.

9. The remote terminal unit as claimed in claim 8, wherein the controller is further configured to receive one or more additional configuration blocks associated with a third wireless protocol, from a configuration tool, upon commissioning of a field device capable of communicating using the third wireless communication protocol in the industrial plant.

10. The remote terminal unit as claimed in claim 8, wherein the controller is configured to operate the one or more radio front ends in a time domain shared mode.

* * * * *